United States Patent [19]

Kuyama

[11] Patent Number: 5,245,239
[45] Date of Patent: Sep. 14, 1993

[54] SMALL D.C. MOTOR

[75] Inventor: Koji Kuyama, Yonago, Japan

[73] Assignee: Matsushita Electric Industrial Co., Ltd., Kadoma, Japan

[21] Appl. No.: 943,006

[22] Filed: Sep. 9, 1992

[30] Foreign Application Priority Data

Sep. 11, 1991 [JP] Japan .................. 3-231590

[51] Int. Cl.5 ............................ H02K 13/10
[52] U.S. Cl. ................. 310/233; 310/40 MM; 310/42; 310/221
[58] Field of Search .......... 310/233, 45, 234, 220, 310/235, 221, 236, 237, 228, 42, 266, 40 MM; 29/597; 184/6.16, 67

[56] References Cited

U.S. PATENT DOCUMENTS

| 2,555,997 | 6/1951 | Portail | 310/228 U X |
| 4,319,153 | 3/1982 | Mabuchi | 310/233 |
| 4,409,505 | 10/1983 | Petersen | 310/40 MM |
| 4,426,594 | 1/1984 | Hirano | 310/233 |

FOREIGN PATENT DOCUMENTS

| 0607719 | 1/1935 | Fed. Rep. of Germany | 310/228 |
| 0621108 | 4/1949 | United Kingdom | 310/228 |
| 0807799 | 1/1959 | United Kingdom | 310/228 |

Primary Examiner—R. Skudy
Attorney, Agent, or Firm—Renner, Otto, Boisselle & Sklar

[57] ABSTRACT

A small d.c. motor which includes a commutator including a plurality of commutator segments, a resilient metal brush kept in contact with the commutator segments, the commutator segments being coated with a layer of a lubricating fluid.

3 Claims, 2 Drawing Sheets

SMALL D.C. MOTOR

BACKGROUND OF THE INVENTION

1. Field of the Invention

The present invention relates to a small direct current (d.c.) motor adapted for use in office automation equipment and video equipment.

2. Description of the Prior Art

In recent years, office automation equipment and video equipment are miniaturized into a small size. This compact-size equipment requires a low-energy small d.c. motor. There are several proposals for small d.c. motors for such use. A typical example of a known small d.c. motor will be described by referring to FIGS. 1A and 1B:

The exemplary d.c. motor includes a stator section which includes a casing 22 for accommodating a magnet 21, and a rotor 23 rotatably carried on a rotary shaft 24 inside the magnet 21. The rotary shaft 24 is provided with a commutator 26 having a plurality of commutator segments 25. The commutator segments 25 are kept in contact with a brush 27 which is provided with a piece of anti-shock rubber 28. The brush 27 is supported against the casing 22 by means of a bracket 30 through a terminal plate 29.

There is a trend that as the motor is miniaturized, the contact points are proportionally reduced in size. In accordance with this trend, a metal brush becomes popular so as to reduce the resistance of the contact points to friction. In order to achieve the reliability of metal brushes, it is essential in view of reliability to reduce the friction between the commutator segments 25 and the brush 27. If the friction between the commutator segments 25 and the brush 27 is unstable, the pressure of contact therebetween varies. Any varying pressure unfavorably affects the rotating speed (rotations per minute, i.e., R.P.M.) of the motor. In addition, a gap occurs between the commutator segments 25 and the brush 27 in which electric current tends to arc, which tends to wear the brush 27 and commutator segments 25.

One proposed solution to the problem mentioned above is that the terminal plate 29 is exactly positioned with respect to the brush 27 so that the resiliency of the brush 27 can be stabilized. When the brush 27 has a relatively large resiliency, the varying contact pressure unfavorably affects the rotating speed of the motor, and the current arcing problem becomes more serious.

Another solution is that a piece of anti-shock rubber 28 is fixed to the surface of the brush 27 so as to absorb shocks arising from varying contact pressures. Thus, the brush 27 is protected against various difficulties such as shocks due to uneven contact pressure, seizure due to frictional heat, and the production of oxidized organic substances which are likely to be produced by current arcing in the air.

In accordance with the recent speed-up trend in general, a high speed rotation is demanded for electric motors. In order to facilitate the speed-up operation, it is necessary to reduce the contact pressure between the commutator segments and the brush. In addition, the miniaturization of d.c. motors is also demanded in the industry but the known d.c. motors have a brush having a relatively short resilient portion which is liable to resilient deformation. Because of the short resilient portion, the precise positioning of the terminal plate 29 or the brush 27 is difficult if it is to achieve a required range of contact pressure. Furthermore, because of the small size of the motor, the anti-shock rubber 28 cannot be fitted to the brush 27. In the end, the torque is lost, and the reliability is reduced.

SUMMARY OF THE INVENTION

The small d.c. motor of this invention, comprises a commutator including a plurality of commutator segments, and a resilient metal brush kept in contact with the commutator segments, the commutator segments being coated with a layer of a lubricating fluid medium.

Thus, the invention described herein makes possible the advantages of providing a small d.c. motor capable of substantially reducing frictional loss between the brush and the commutation segments, and capable of withstanding a long period of use.

The surface of the commutator is coated with a lubricating fluid layer. As a result, even if the resiliency of the brush varies over use, the oil layer is retained. Owing to the presence of an excellent lubricating fluid layer such as olefin-base oil between the brush and the commutator, the friction is reduced, thereby minimizing both the loss of torque and frictional wear. Since the brushes smoothly slide on the commutator, a stable sliding movement is achieved even if no anti-shock rubber is used. Olefin-base oil does not chemically react with metal unlike ester-base oil or diester-base oil, nor does it react with resins. Therefore, the olefin-base oil layer does not spoil the commutator and the bristles of the brush, thereby enabling the motor to withstand a long period of use. In addition, the viscosity of olefin-base oil is kept constant irrespective of changes in temperatures, thereby allowing olefin-base oil to be used in a wide range of temperatures. Furthermore, if arcing should occur from the rotation of the commutator, olefin-base oil will be easily burned, but will leave no harmful organic oxides. Thus, the reliability of the motor is enhanced. Advantages of olefin-base oil in using for the present invention are as follows:

(1) It has a high lubricability;
(2) It has no reactivity with metals;
(3) It has a chemical stability with resins;
(4) It has viscosity stable over changes in temperatures; and
(5) It has a straight chain of carbon.

These and other advantages of the present invention will become apparent to those skilled in the art upon reading and understanding the following detailed description with reference to the accompanying figures.

DESCRIPTION OF THE PREFERRED EMBODIMENTS

EXAMPLE 1

Figure 1A:
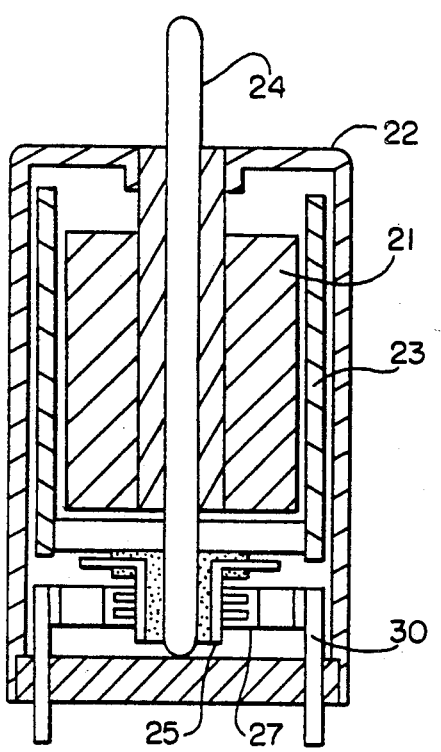
FIGS. 1A and 1B are cross-sectional views showing a known small d.c. motor.
Figure 2A:
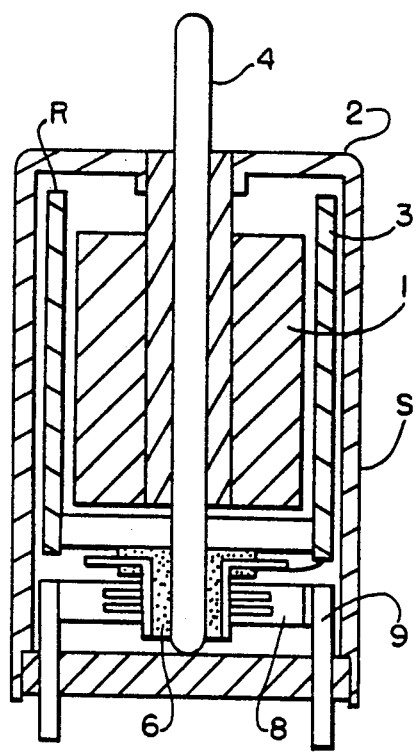
FIGS. 2A and 2B are cross-sectional views showing a first example of a small d.c. motor according to the present invention.
Figure 1B:
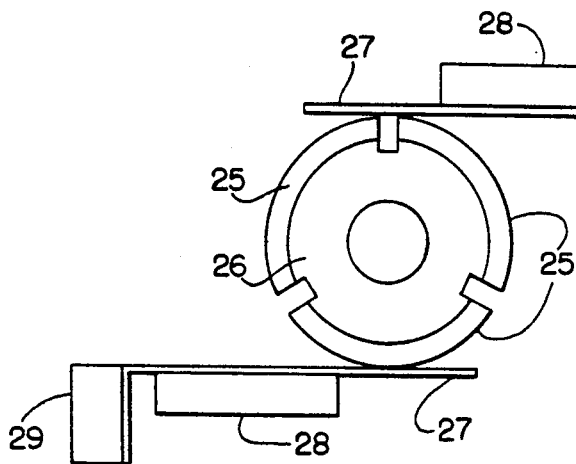
Figure 2B:
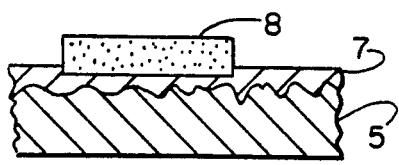

Referring to FIGS. 2A and 2B, the exemplary motor includes a stator section S which includes a casing 2 provided with a magnet 1. The casing 2 accommodates a rotor section R including a rotor 3 rotatably carried on a rotary shaft 4 which is provided with a commutator 6. The commutator 6 has commutator segments 5 which are coated with a layer 7 of olefin-base oil. The commutator segments 5 are kept in contact with a resilient brush 8 of metal which is fixed to the casing 2 through a bracket 9. The layer 7 is formed by dispersing olefin-base oil in the air in which the commutator 6 is suspended.

Figure 3:
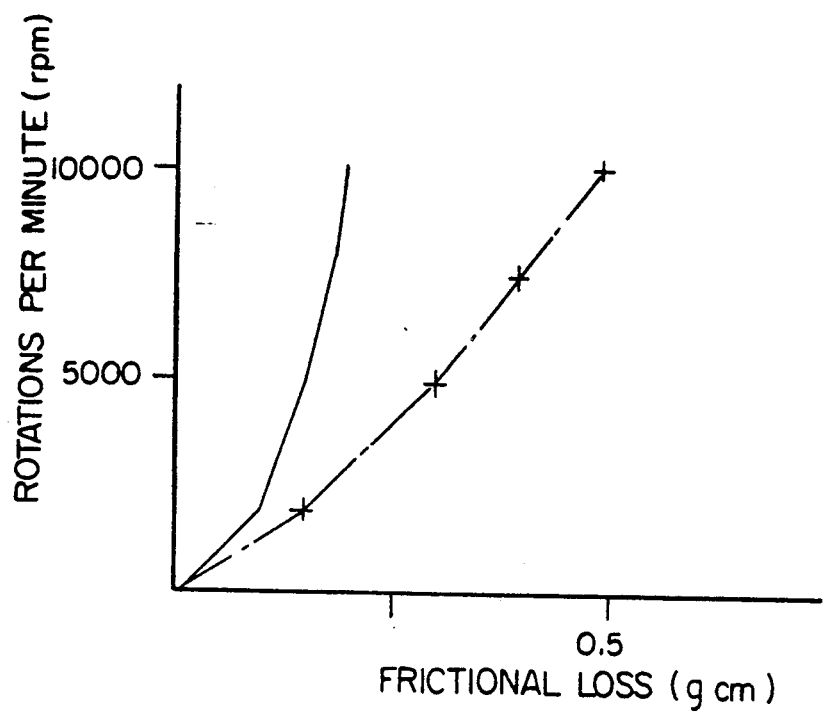
FIG. 3 is a graph depicting the relationship between the frictional loss and the rotating speeds of the motor shown in FIGS. 2A and 2B, wherein the full line indicates the results of the present invention and the chain line indicates those of the known d.c. motor.

The motor is operated as follows:

The olefin-base oil is caused to spread between the brush 8 and the commutator segments 5 under the influence of viscous resistance to the sliding movement therebetween, and forms as the layer 7. The layer 7 reduces the friction between the commutator segments 5 and the brush 8, thereby improving the relationship between the frictional loss and the rotating speed of the motor as shown in FIG. 3 wherein the full line indicates the results of the present invention and the chain line indicates those of the known d.c. motor. Since the layer 7 is made of olefin-base oil, any insulating substances are prevented from being produced by incomplete combustion or chemical reaction with metal or resin which otherwise would be likely to occur when the motor is stored for a long period of time in a non-use state. In this way the reliability of the d.c. motor is increased.

EXAMPLE 2

Figure 4:
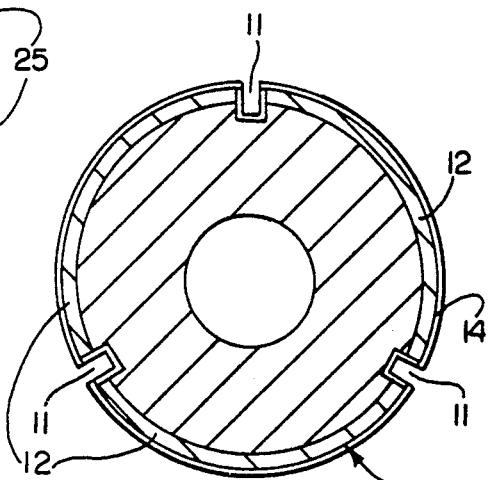
FIG. 4 is a cross-sectional view showing a second example of a small d.c. motor commutator according to the present invention.
Figure 5:
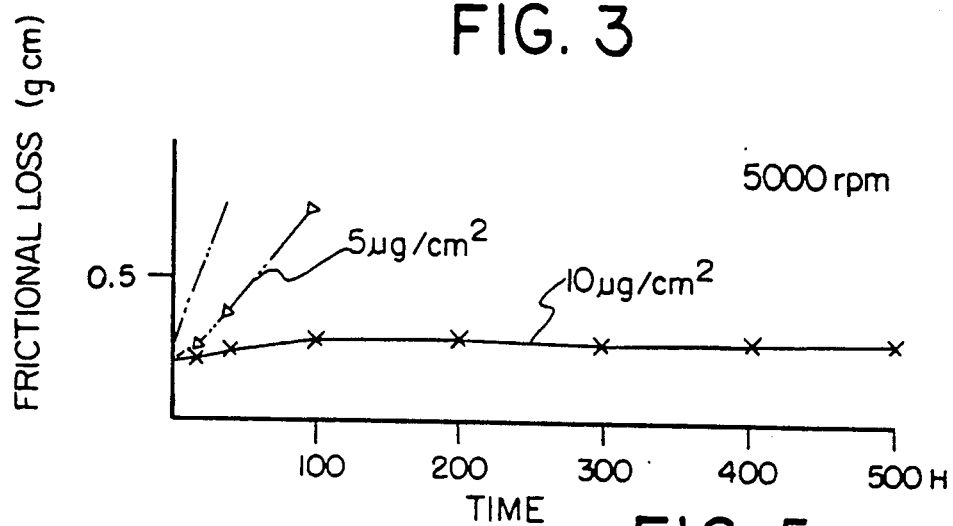
FIG. 5 is a graph depicting the characteristics of frictional loss at 5000 rpm, wherein the full line indicates the results of the present invention and the chain line indicates those of the known d.c. motor.
Figure 6:
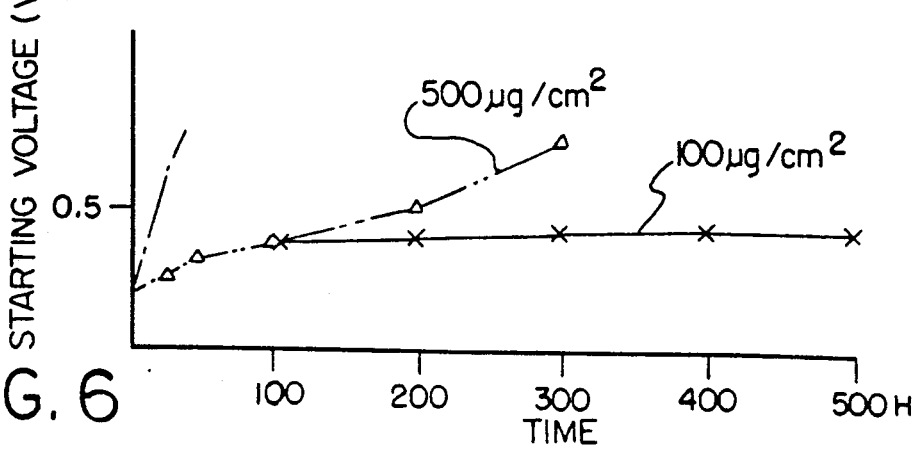
FIG. 6 is a graph showing a graph depicting the characteristics of starting voltage in the present invention, wherein the full line indicates the results of the present invention and the chain line indicates those of the known d.c. motor.

Referring to FIGS. 4 to 6, a second example of the invention will be described:

The commutator segments 12 are separated by slits 11 so as to electrically isolate one segment from another. The commutator 13 is coated with a layer 14 of olefin-base oil which is contained at a ratio of 5 $\mu g/cm^2$ to 500 $\mu g/cm^2$ (where 1 $\mu g = 1 \times 10^{-6}$ gram).

This motor is operated as follows:

If the layer 14 on the surface of the commutator becomes 5 $\mu g/cm^2$ or less in thickness, it loses the effectiveness to reduce the sliding friction. If it becomes 500 $\mu g/cm^2$ or more, organic substances increase in amount, thereby increasing the amount of organic oxides or blackened matter. As the amount of organic substances increases, they flood the slits 11 and overflow onto the sliding surfaces of the commutator segments 12, thereby increasing the friction between the commutator segments 12 and the brush 8. As a result, the starting voltage is increased. In order to avoid these unfavorable situations, the amount of the oil applied to the surface of the commutator 13 is controlled to a given quantity. Thus, the reliability of the small d.c. motor is increased.

As shown in FIG. 5, according to the present invention the frictional loss of a small d.c. motor is reduced by means of the lubricating layer. In order to achieve sufficient stability, the quantity of the lubricating layer is preferably 5 $\mu g/cm^2$ or more in view of the roughness of the surface of the commutator 13.

As is evident from FIG. 6, variations with time in the starting voltage of the motor are more particularly suppressed as compared with the known miniaturized d.c. motor. The amount of blackened organic substances increase with time, which requires a stepped-up starting voltage. In order to prevent this unfavorable situation, the amount of oil is preferably not greater than 500 $\mu g/cm^2$. Thus, the life of the motor is increased.

In this way, an economical and reliable small d.c. motor is obtained by controlling the thickness of the olefin-base oil layer 14 of from 5 $\mu g/cm^2$ to 500 $\mu g/cm^2$.

Various other modifications will be apparent to and can be readily made by those skilled in the art without departing from the scope and spirit of this invention. Accordingly, it is not intended that the scope of the claims appended hereto be limited to the description as set forth herein, but rather that the claims be construed.

What is claimed is:

1. A small d.c. motor, comprising:
    a commutator including a plurality of commutator segments, and
    a resilient metal brush kept in contact with the commutator segments, and
    wherein the commutator segments are coated with a layer of a lubricating fluid made of olefin-base oil, and wherein the layer has thickness ranging from 5 $\mu g/cm^2$ to 500 $\mu g/cm^2$.

2. A small d.c. motor according to claim 1, wherein the commutator comprises a plurality of slits formed on a periphery of the commutator.

3. A small d.c. motor according to claim 1, wherein the layer is formed by dispersing the olefin-based oil in air in which the commutator is suspended.

* * * * *